United States Patent Office 2,962,502
Patented Nov. 29, 1960

2,962,502

PREPARATION OF 2,2'-BIPYRIDYL

Peter Frank Hilary Freeman and Ranajit Ghosh, Bracknell, England, assignors to Imperial Chemical Industries Limited, London, England, a corporation of Great Britain No Drawing. Filed Jan. 5, 1959, Ser. No. 784,879

Claims priority, application Great Britain Jan. 24, 1958

5 Claims. (Cl. 260—296)

This invention relates to a new manufacturing process and more particularly it relates to a new process for the manufacture of 2:2'-bipyridyl from pyridine.

It has been proposed to manufacture 2:2'-bipyridyl from pyridine by oxidation thereof with ferric chloride. This known process is unsatisfactory in that the yield of 2:2'-bipyridyl is low. Numerous side-reactions take place leading to by-products.

We have now found that these disadvantages may be obviated by oxidising pyridine by means of ferrous chloride. It is surprising that ferrous chloride can be used in this manner since it does not normally act as an oxidising agent.

According to the invention we thus provide a process for the manufacture of 2:2'-bipyridyl which comprises heating pyridine with ferrous chloride. The process of the invention may conveniently be carried out at superatmospheric pressure for example in a sealed tube, or an autoclave or other pressure vessel.

The process is preferably carried out at temperatures between 250° C. and 350° C., preferably between 270° C. and 340° C. At temperatures below 250° C. the reaction is inconveniently slow and at temperatures above 350° C. considerable decomposition takes place. Nevertheless in the operation of a continuous process or in other instances where a short reaction time is desired, possibly the use of temperatures in the region of 350° C. may be advantageous.

The proportions of pyridine and ferrous chloride used in the process of the invention may be varied within wide limits. The process may for example be successfully carried out with molar ratios of pyridine to ferrous chloride between 3 to 1 and 25 to 1.

The ferrous chloride used in the process of the invention may be in the hydrated form or it may be anhydrous and it may be added to the pyridine as free ferrous chloride or as the hydrate or again in the form of a ferrous chloride-pyridine complex.

The 2-2'-bipyridyl may be isolated from the reaction mixture by any convenient means known to the art, for example by separation therefrom as an iron complex, by steam distillation, by distillation or solvent extraction. The excess of pyridine may be recovered and again used for the process.

2:2'-bipyridyl is a valuable intermediate compound for use for example in the manufacture of the herbicidal compounds for example 1:1'-ethylene-2:2'-dipyridylium dibromide.

The invention is illustrated but not limited by the following example in which the parts are by weight:

Example

A mixture of 40 parts of ferrous chloride tetrahydrate and 78 parts of pyridine is heated in a sealed tube during 20 hours. The contents of the tube are then cooled and mixed with 2,500 parts of water. The mixture is made strongly alkaline by adding a solution of 600 parts of sodium hydroxide in 800 parts of water and it is then subjected to steam distillation. To the distillate there is added aqueous hydrochloric acid until the pH value is 1.0. The mixture is then evaporated to dryness and the residue is made strongly alkaline by the addition of sodium hydroxide solution. It is then extracted with ether and the extract is fractionally distilled. There is obtained 60.4 parts of unchanged pyridine and 13 parts of 2:2'-bipyridyl M.P. 68° C. to 69° C. This corresponds to a yield of 75% based on the pyridine consumed.

What we claim is:

1. Process for the manufacture of 2:2'-bipyridyl which comprises heating pyridine with ferrous chloride at superatmospheric pressure and a temperature between about 250° C. and 350° C., whereby said pyridine is oxidized to 2:2'-dipyridyl, the ferrous chloride constituting the sole essential oxidizing agent.

2. Process as claimed in claim 1 wherein the reaction temperature is between 270° C. and 340° C.

3. Process as claimed in claim 1 wherein the molar ratio of pyridine to ferrous chloride is between 3 to 1 and 25 to 1.

4. Process as claimed in claim 1 wherein the ferrous chloride is in the form selected from the group consisting of the anhydrous salt, the hydrate and ferrous chloride-pyridine complex.

5. Process for the manufacture of 2:2'-bipyridyl which comprises heating pyridine with ferrous chloride at a temperature between about 250° C. and 350° C. and superatmospheric pressure using a molar ratio of pyridine to ferrous chloride between 3 to 1 and 25 to 1, and thereafter isolating the resulting 2:2'-dipyridyl from the reaction mixture.

References Cited in the file of this patent

Case: J. Am. Chem. Soc. vol. 68, pp. 2574–2577 (1946).

Hein et al.: Ber. Deut. Chem., vol. 61B, pp. 1790–1791 (1928).